| United States Patent [19] | [11] Patent Number: 4,888,127 |
| Wada et al. | [45] Date of Patent: Dec. 19, 1989 |

[54] LIQUID CRYSTAL POLYESTER RESIN COMPOSITION HAVING EXCELLENT SURFACE CHARACTERISTICS

[75] Inventors: Mitsuo Wada; Toshio Kanoe, both of Fuji; Takayuki Ishikawa, Shimizu, all of Japan

[73] Assignee: Polyplastics Co., Ltd., Osaka, Japan

[21] Appl. No.: 127,413

[22] Filed: Dec. 2, 1987

[30] Foreign Application Priority Data

Dec. 10, 1986 [JP] Japan ................... 61-294427

[51] Int. Cl.$^4$ .................. C09K 19/54; C08K 5/01
[52] U.S. Cl. ................ 252/299.5; 253/220; 253/513; 252/299.01; 524/847
[58] Field of Search ............. 252/299.01, 299.62; 523/220, 513; 524/847

[56] References Cited

U.S. PATENT DOCUMENTS

| 4,439,578 | 3/1984 | Kim et al. | 525/425 X |
| 4,522,884 | 6/1985 | Brody | 428/372 X |
| 4,581,443 | 4/1986 | Garg | 528/480 |
| 4,661,529 | 4/1987 | Blocker | 524/602 X |
| 4,664,972 | 5/1987 | Connolly | 528/173 X |
| 4,693,932 | 9/1987 | Kuze | 523/220 X |
| 4,708,976 | 1/1987 | Ryan | 524/432 X |

*Primary Examiner*—Stephen J. Kalafut
*Attorney, Agent, or Firm*—Birch, Stewart, Kolasch & Birch

[57] ABSTRACT

A liquid crystal polyester composition having an improved resistance to deformation comprising 99.5 to 30 percent by weight of a polyester which is melt-processable and capable of forming an anisotropic phase in the melt state and 0.5 to 7 percent by weight of filler particles.

28 Claims, No Drawings

LIQUID CRYSTAL POLYESTER RESIN COMPOSITION HAVING EXCELLENT SURFACE CHARACTERISTICS

The present invention relates to a thermoplastic resin composition having excellent surface characteristics and suitable as molding materials for plastic molded articles which must have high accuracy and excellent surface characteristics, e.g., components of electronic appliances, parts such as pickup parts of a compact disk player and ferrules of optical fibers.

[Prior Art and Problems]

A group of plastics, the o-called engineering plastics are replacing metallic parts by virtue of their high strength. Particularly, a group of plastics called liquid crystal polyester melt while maintaining their crystalline structure. This leads to advantages of the molded articles obtained therefrom, such as high strength by virtue of the crystalline structure and small degree of molding shrinkage due to a small difference in the volume between a molten state and a solid state. This difference is attributable to the fact that the crystalline structure does not significantly change when it is solidified. At the same time, this also leads to an advantage that the viscosity in a molten state is low, thus making it easy to mold. However, these plastics have a drawback with respect to surface characteristics because the molecules of these plastics are highly oriented on the surface thereof, which raises a problem on practical use.

The drawback with respect to surface characteristics resides in the fact that the occurrence of repeated friction or repeated application of percussions on the surface thereof leads to the fibrillation of the surface thereof which causes fluffing. Therefore, the molded articles not only have a poor appearance but also have problems of lowering the accuracy of the molded articles and a possible adverse effect of fibrillation and fluffing on electronic devices in which the molded articles are used. For this reason, the elimination of the above-mentioned problems is desired. The present inventors have made various studies on these problems, which has led to the present invention.

[Means to Solve the Problems]

The present inventors have made various studies on the surface characteristics of a newly developed melt processable polyester capable of forming an anisotropic melt phase (hereinafter abbreviated to "liquid crystal polyester"), and particularly on the solution to the problems through the use of additives. As a result, the present inventors have found that a particulate material unexpectedly improves the surface characteristics, which led to the completion of the present invention.

The present invention provides a liquid crystal polyester composition, having excellent surface characteristics, which comprises 99.5 to 30 percent by weight of a polyester being melt-processable and being capable of forming the anisotropic phase in the melt state and 0.5 to 70 percent by weight of a filler of particles or a particulate material.

The liquid crystal polymer which may be used in the present invention is a melt processable polyester and has properties such that the molecular chains are regularly arranged parallel to each other in a molten state. The state in which molecules are arranged in this manner is often called a liquid crystal state or a nematic phase of a liquid crystal material. Such polymer molecules are generally comprised of polymers which are slender and flat and have considerably high rigidity along the major axis of the molecules and a plurality of chain-extending bonds which are usually in either a coaxial relationship or a parallel relationship with each other.

The properties of the anisotropic molten phase may be examined by a customary polar metric method using crossed polarizers. More particularly, the anisotropic molten phase can be examined by observing a molten sample placed on a Leitz hot stage in a nitrogen atmosphere at a magnification of 40 under a Leitz polarization microscope. The above-mentioned polymer is optically anisotropic. Namely, when it is placed between crossed polarizers, it permits transmission of a light beam. If the sample is optically anisotropic, the polarized light will be transmitted, even when it is in a static state.

The components of the polymer which forms the anisotropic molten phase as mentioned above are those selected from the group consisting of:

① at least one member selected from the group consisting of aromatic dicarboxylic acids and alicyclic dicarboxylic acids;

② at least one member selected from the group consisting of aromatic diols, alicyclic diols, and aliphatic diols;

③ at least one member selected from the group consisting of aromatic hydroxy carboxylic acids;

④ least one member selected from the group consisting of aromatic thiol carboxylic acids;

⑤ at least one member selected from the group consisting of aromatic dithiols and aromatic thiol phenols; and ⑥ at least one member selected from the group consisting of aromatic hydroxy amines and aromatic diamines. The polymer which forms the anisotropic molten phase is a polyester capable of forming an anisotropic molten phase and comprised of a combination of components such as:

(I) a polyester comprised of the components ① and ②;

(II) a polyester comprised of only the component ③;

(III) a polyester comprised of the components ①, ②, and ③;

(IV) a polythiolester comprised of only the component ④;

(V) a polythiolester comprised of the components ① and ⑤;

(VI) a polythiolester comprised of the components ①, ④, and ⑤;

(VII) a polyesteramide comprised of the components ①, ③, and ⑥; and (VIII) a polyesteramide comprised of the components ①, ②, ③, and ⑥.

Aromatic polyazomethines are also a polymer which forms the anisotropic molten phase, although they are not included in the category of the above-mentioned combinations of components. Particular examples of such aromatic polyazomethines include poly(nitrilo-2-methyl-1,4-phenylenenitriloethylidyne-1,4-phenyleneethylidyne); poly(nitrilo-2-methyl-1,4-phenylenenitrilomethylidyne-1,4-phenylenemethylidyne; and poly(-nitrilo-2-chloro-1,4-phenylenenitrilomethylidyne-1,4-phenylenemethylidyne).

Further, polyester carbonates are also a polymer which forms the anisotropic molten phase, although they are not included in the category of the above-mentioned combinations of components. They are comprised essentially of 4-oxybenzoyl units, dioxyphenyl units, dioxycarbonyl units, and terephthaloyl units.

The above-mentioned polyesters (I), (II), and (III) and polyester-amide (VIII) which are polymers capable of forming an anisotropic molten phase suitable for use in the present invention may be produced by various ester forming processes in which organic monomer compounds having functional groups capable of forming required repetitive units through condensation are mutually reacted. Examples of the functional groups of these organic monomer compounds include carboxyl group, hydroxyl group, ester group, acyloxy group, acyl halide group, and amino group. The organic monomer compounds can be reacted by a melt acidolysis method in the absence of any heat exchange fluid. According to this method, the monomers are first heated together to form a melt of reactants. As the reaction proceeds, solid polymer particles are suspended in the melt. Vacuum may be applied in order to facilitate the removal of volatile matter (e.g., acetic acid or water) which is produced as a by-product in the final stage of the condensation.

Further, a slurry condensation method may also be adopted in forming a liquid crystal aromatic polyester suitable for use in the present invention. In this method, the solid product is obtained in such a state that it is suspended in a heat exchange medium.

In both the above-mentioned melt acidolysis process and slurry polymerization process, the organic monomer reactants from which the liquid crystal polyester is derived may be used in the reaction in a modified form in which the hydroxyl groups of such monomers have been esterified (i.e., in the form of a lower acyl ester). The lower acyl group preferably has 2 to 4 carbon atoms. It is preferred that acetates of the organic monomer reactants be used in the reaction.

Representative examples of the catalyst which can be used at will in both the melt acidolysis and slurry process include dialkyltin oxides (e.g., dibutyltin oxide), diaryltin oxides, titanium dioxide, antimony trioxide, alkoxytitanium silicate, titanium alkoxide, alkali and alkaline earth metal salts of carboxylic acids (e.g., zinc acetate), Lewis acids (e.g., $BF_3$) and gaseous catalysts such as hydrogen halides (e.g., HCl). The amount of the catalyst is generally about 0.001 to 1% by weight, preferably about 0.01 to 0.2% by weight, based on the total weight of the monomers.

The liquid crystal polymers suitable for use in the present invention tend to be substantially insoluble in usual solvents, which renders them unsuitable for use in solution processing. However, as mentioned above, these polymers may be readily processed by ordinary melt processing. Especially preferable liquid crystal polymers are those soluble in pentafluorophenol to some extent.

The liquid crystal polyester suitable for use in the present invention have a weight-average molecular weight of about 2,000 to 200,000, preferably about 10,000 to 50,000, and particularly preferably about 20,000 to 25,000. On the other hand, the wholly aromatic polyester-amide suitable for the present invention has a molecular weight of about 5,000 to 50,000, preferably about 10,000 to 30,000, e.g., 15,000 to 17,000. The molecular weight may be determined by gel permeation chromatography and other standard determination methods which do not involve the formation of a solution of polymers, e.g., by determining the terminal groups by infrared spectroscopy in the form of a compression-molded film. Alternatively, the molecular weight may be determined by a light scattering method in the form of a pentafluorophenol solution.

The above-mentioned liquid crystal polyesters and polyester-amides exhibit an inherent viscosity (I.V.) of at least about 2.0 dl/g, e.g., about 2.0 to 10.0 dl/g, as determined at 60° C. in the form of a solution prepared by dissolving the polymer in pentafluorophenol to have a polymer concentration of 0.1% by weight.

Polyesters which form an anisotropic melt phase suitable for use in the present invention are aromatic polyesters and aromatic polyester-amides and may also include polyesters which partially contain aromatic polyester units and aromatic polyester-amide units in the same molecular chain.

Examples of the compounds constituting the above-mentioned polymers include naphthalene compounds such as 2,6-naphtalenedicarboxylic acid, 2,6-dihydroxynaphthalene, 1,4-dihydroxynaphthalene, and 6-hydroxy-2-naphthoic acid, biphenyl compounds such as 4,4'-biphenyldicarboxylic acid and 4,4'-dihydroxybiphenyl, compounds represented by the following general formulae (I), (II), or (III):

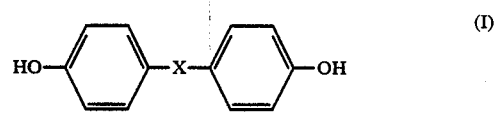

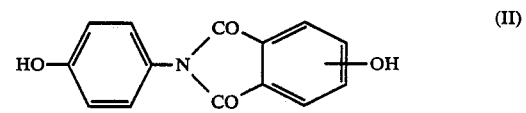

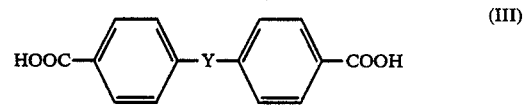

[wherein X is a group selected from among an alkylene (having 1 to 4 carbon atoms), an alkylidene, —O—, —SO—, —SO$_2$—, —S—, and —CO—; and Y is a group selected from —(CH$_2$)$_n$— (wherein n is 1 to 4) and —O(CH$_2$)$_n$O— (wherein n is 1 to 4)]; parasubstituted benzene compounds such as p-hydroxybenzoic acid, terephthalic acid, hydroquinone, p-aminophenol, and p-phenylenediamine and nucleus-substituted compounds thereof (wherein the substituent is selected from among chlorine, bromine, methyl, phenyl, and 1-phenylethyl); and meta-substituted benzene compounds such as isophthalic acid and resorcinol.

Further, the liquid crystal polyester which is used in the present invention may be a polyester partially containing a polyalkylene terephthalate portion which does not exhibit any anisotropic melt phase in the same molecular chain besides the above-mentioned components. In this case, the alkyl group has 2 to 4 carbon atoms.

Among the polymers comprised of the above-mentioned components, polymers containing at least one member selected from among naphthalene compounds, biphenyl compounds, and para-substituted benzene compounds as essential component are more preferable. Particularly preferable para-substituted benzene compounds include p-hydrobenzoic acid, methylhydroquinone, and 1-phenylethylhydroquinone.

Polyesters capable of forming an anisotropic melt phase which are particularly preferably used in the present invention are those containing about 10 mol % or more of repetitive units containing a naphthalene portion, such as 6-hydroxy-2-naphthoyl, 2,6-dihydroxynaphthalene, and 2,6-dicarboxynaphthalene. Preferable polyester-amides are those containing repetitive units containing the above-mentioned naphthalene portion and a portion comprised of 4-aminophenol or 1,4-phenylenediamine.

Specific examples of the compounds which are components in the above-mentioned polymers (I) to (VIII) and specific examples of polyesters capable forming an anisotropic melt phase and suitable for use in the present invention are described in Japanese Patent Laid-Open No. 69866/1986.

In the present invention, the term "particulate material" is intended to mean a material which does not extend in any particular direction and is unlike a material in the form of fiber, sheet or slip. The ratio of the diameter around the central portion to the length in the perpendicular direction (hereinafter abbreviated to "aspect ratio") is 3 or less, preferably between 2 and 1. Further, the average particle diameter is 0.01 μm to 1 mm, preferably 0.1 to 100 μm, more preferably 1 to 50 μm. The specific examples of the particulate material include silicates such as kaolin, clay, vermiculite, calcium silicate, aluminum silicate, feldspar powder, acid clay, agalmatolite clay, sericite, sillimanite, bentonite, glass powder, glass bead, slate powder, and silane; carbonates such as calcium carbonate, chalk, barium carbonate, magnesium carbonate, and dolomite; sulfates such as baryte powder, blanc fixe, precipitated calcium sulfate, plaster of Paris, and barium sulfate; hydroxides such as hydrated alumina; alumina, antimony oxide, magnesia, titanium oxide, chinese white, silica, silica sand, quartz, silica, white carbon, and diatomite; sulfides such as molybdenum disulfide; particulate metal; organic high-molecular materials such as fluorocarbon resin; organic low-molecular crystals such as brominated diphenyl ether; spherical fiber or fiber having a small length to diameter ratio; and sheet powder having small diameter and thickness.

With respect to the above-mentioned particulate materials, those exhibiting effects inherent in powder, e.g., specific function and effect such as electrical conductivity and lubricity, were positively used in the past. However, in general, the particulate materials were used as an extender of plastics and caused unevennessess on the surface of molded articles, which spoiled the luster. On the other hand, the use of the particulate materials in combination with the liquid crystal polyester can improve the surface characteristics thereof.

Examples of the fibrous material useful for the present invention include glass fiber, carbon fiber, graphitized fiber, whisker, metallic fiber, inorganic fiber, synthetic fiber, mineral fiber, and various organic fibers such as natural fibers.

Specific examples of the fibrous material are as follows.

Examples of the glass fiber include not only ordinary glass fibers but also those coated with a metal such as nickel or copper, silane fiber, aluminosilicate glass fiber, hollow glass fiber, and non-hollow fiber. Examples of the carbon fiber include PAN fiber prepared by making use of polyacrylonitrile as the starting material and pitch fiber prepared by making use of pitch as the starting material.

Examples of the whisker include silicon nitride whisker, silicon oxynitride whisker, basic magnesium sulfate whisker, barium titanate whisker, silicon carbide whisker, and boron whisker. Examples of the metallic fiber include fibers made of mild steel, stainless steel, steel and its alloy, brass, aluminum and its alloy, and lead.

Examples of the inorganic fiber include various fibers made of rock wool, zirconia, alumina silica, potassium titanate, barium titanate, silicon carbide, alumina, silica, and blast furnace slag. Examples of the synthetic fiber include aramid fiber which is a wholly aromatic polyamide and Kynol which is a phenolic resin fiber.

Examples of the mineral fiber include asbestos and wollastonite. Examples of the natural fiber include cellulose fiber and hemp yarn.

The effect of the present invention will now be substantiated by a simple model test.

Particulate materials were added to a liquid crystal polyester resin A, which will be described later, to determine the surface characteristics and other physical properties. Some of the results are shown in Table 1.

With respect to the data as shown in Table 1, the effect of the additives will now be compared with each other in terms of the same amount of addition (% by weight). A composition containing a particulate material added therein was inferior in luster to an unfilled composition. However, in the friction test, the unfilled composition easily caused fluffing on the surface thereof, while the composition containing the particulate material apparently caused little or no fluffing and remarkably improved the surface characteristics. With respect to a composition containing a fibrous material added therein, the effect on the fluffing was substantially the same as that attained by the addition of the particulate material. However, the composition gave rise to flow marks like moiré fringes on the surface of the molded articles, which not only spoiled the appearance but also led to poor frictional characteristics. In the case of the addition of a particulate material, the strength is somewhat lowered. Therefore, when the composition is used in an application where particularly high strength is required, the particulate material may be used in combination with the so-called fibrous reinforcing material. As mentioned above, the fibrous reinforcing material gives rise to flow marks like moiré fringes. However, it brings about little or no fluffing, and the combined use thereof with the particulate material reduces the occurrence of the flow marks, which makes it possible to improve the strength of the composition without sacrificing any effect of the present invention.

TABLE 1

| powder | amt. of addn.*1 (wt. %) | form | surface state before friction luster | after friction fibril | tensile strength (kg/cm$^2$) |
|---|---|---|---|---|---|
| none | — | — | lustrous | observed | 2100 |
| GP*2 | 30 | fibrous | luster less (moire) | none | 2200 |
| wollastonite*3 | 30 | " | slightly lustrous | " | 1780 |
|  | 50 | " | slightly lustrous | " | 1400 |
| GPL*4 | 30 | sheet | luster less | " | 1540 |
|  | 50 | " | " | " | 1200 |
| MPL (A)*5 | 30 | " | " | " | 1300 |
|  | 50 | " | " | " | 880 |
| MPL (B)*5 | 30 | " | " | " | 1200 |
|  | 50 | " | " | " | 350 |
| MPL (C)*5 | 30 | " | " | " | 1300 |

TABLE 1-continued

| powder | amt. of addn.*[1] (wt. %) | form | surface state before friction luster | after friction fibril | tensile strength (kg/cm$^2$) |
|---|---|---|---|---|---|
| | 50 | " | " | " | 750 |
| talc*[6] | 30 | " | " | " | 1670 |
| | 50 | " | " | " | 1210 |
| GB*[7] | 30 | particulate | slightly lustrous | " | 660 |
| | 50 | particulate | slightly lustrous | " | 460 |

Note:
*[1] the amount of addition based on the total amount of the composition
*[2] GF: glass fiber (an average thickness of 10 μm; an average length of 4.7 mm)
*[3] wollastonite (an average thickness of 3.5 μm; an average length of 70 μm)
*[4] GFL: glass flake (an average thickness of 150 μm; an average length of 4 μm)
*[5] MFL: mica flake (A) (an average diameter of 8.0 μm; an average thickness of 0.2 μm) (B) (an average diameter of 2.5 μm; an average thickness of 0.2 μm) (C) (an average diameter of 8.0 μm; an average thickness of 0.2 μm) (treated with aluminosilane)
*[6] talc (an average diameter of 10 μm; an average thickness of 1 μm)
*[7] GB: glass bead (an average particle diameter of 19 μm)

The larger the amount of the particulate material added, the better the improvement in the surface characteristics. However, the use in an excessive amount spoils the moldability, which leads to the lowering in the mechanical strength of the molded articles. Therefore, the amount of the sheet powder added is 0.5 to 70% by weight, preferably 30 to 50% by weight based on the total amount of the composition.

As mentioned above, the fibrous reinforcing materials used in combination with the particulate material include glass fiber, carbon fiber, graphitized fiber, whisker, metallic fiber, silicon carbide fiber, mineral fibers such as asbestos and wollastonite, and various organic fibers and are not limited to particular materials. It is preferred that the fibrous reinforcing material have a suitable length to diameter ratio. For example, when the diameter is about 10 μm, the average length of the fiber is 30 μm to 10 mm, preferably 50 to 700 μm. That is, it is preferred that the fiber have an aspect ratio of 5 to 70. It is preferred that the fibrous reinforcing material be added in an amount equal to or less than the amount of the particulate material. The use of the particulate material and fibrous reinforcing material in an amount exceeding 70% by weight in terms of the total weight of the two materials based on the total weight of the composition is undesirable from the standpoint of moldability and strength.

Although the particulate material and fibrous material useful for the present invention may be used as they are, it is possible and desirable to use them in combination with commonly used known surface treatments and binders.

Examples of the surface treatments include functional compounds such as epoxy compounds, isocyanate compounds, silane compounds, and titanium compounds.

These compounds may be used in such a manner that the above-mentioned additives are subjected to a surface treatment or binding treatment with these compounds. Alternatively, these compounds may be added together with the above-mentioned additives in preparing the composition. These treatments are effective in improving the physical properties and flowability. The base resins and the above-mentioned various additives may be used alone or in the form of a mixture of two or more of them.

Further, the liquid crystal polyester of the present invention may be in the form of a polymer blend with other thermoplastic resins in such an amount as will not spoil the purpose of the present invention.

The thermoplastic resins used in this case are not particularly limited. Examples of the thermoplastic resins include polyolefins such as polyethylene and polypropylene, aromatic polyesters comprised of an aromatic dicarboxylic acid and a diol or a hydroxycarboxylic acid, such as polyethylene terephthalate and polybutylene terephthalate, polyacetal (homopolymer or copolymer), polystyrene, polyvinyl chloride, polyamide, polycarbonate, ABS, polyoxyphenylene oxide, polyoxyphenylene sulfide, and fluorocarbon resin. These thermoplastic resins may be used in the form of a mixture of two or more of them. Further, if necessary, various additives may be added to these resins in order to improve various properties such as mechanical, electrical, and chemical properties and flame retardancy.

For example, known materials which are added to general thermoplastic resins and thermosetting resins, i.e., plasticizers, stabilizers such as antioxidants and ultraviolet absorbers, antistatic agents, surfactants, flame retardants, coloring materials such as dyes and pigments, lubricants for improving the flowability and releasability, and crystallization promoters (nucleating agents) can be used at will according to the requirements for properties.

The composition of the present invention can be prepared by customary methods which are used for conventional reinforced resins, filled resins, etc. Preferred examples of the methods include a method which comprises mixing individual additives and extruding the mixture with an extruder to prepare pellets having a composition of the present invention and molding the pellets, a method in which pellets having different compositions of materials incorporated therein are mixed when they are molded, and a method in which the components are each directly fed in a molding machine.

]Effect of the Invention]

As is apparent from the foregoing description, the present invention has been made based on a finding that the surface characteristics are specifically improved only when a particulate material is incorporated in a liquid crystal polyester. The molded articles comprised of the composition of the present invention has excellent surface characteristics, i.e., is less susceptible to surface fibrillation even when friction or percussion is repeatedly applied thereto.

A liquid crystal polyester originally exhibits a small molding shrinkage factor. The composition of the present invention exhibits smaller anisotropy when it is injection molded into molded articles, and the molding shrinkage factor is smaller in any portion and any direction. This enables precision molding and also leads to an advantage that molded articles having an excellent dimensional accuracy can be obtained.

Further, the present invention has a great advantage that the above improvement can be attained while scarcely spoiling the features of the liquid crystal polyester, i.e., high mechanical strength, high melt flowability, high melting point, and high heat resistance.

The composition of the present invention is suitable for use in molding of parts to which friction and percussion are applied, e.g., a camera, a pickup of a laser disk, a carriage, an arm and a lead screw of a floppy disk player, or a pickup of a compact disk player. Further, not only the accuracy of the molded articles which have been molded in an exact agreement with the mold by taking advantage of small molding shrinkage can be maintained for a long period of time, but also an adverse effect of resin powder produced by fibrillation can be prevented.

[EXAMPLES]

The present invention will now be described in more detail with reference to the following examples. However, the present invention is not limited to the combinations of the components as described in the examples.

EXAMPLES 1 TO 20

Mixtures respectively containing liquid crystal polyester resins A, B, C, D, and E as bases which will be mentioned later and having compositions are shown in Table 2 were extruded with an extruder having a diameter of 300 mm to prepare pellets. The pellets thus prepared were molded into 10-cm square flat plates by usual injection molding. The surface of the flat plates was observed. Then, the occurrence of fluffing of the surface of the flat plate was observed by repeating 200 times a test in which a steel piece having a weight of 100 g and a bottom area of 1 cm² is dropped on the plate from a height of 10 cm. The results are shown in Table 2.

TABLE 2

| | | filler | | surface state | |
|---|---|---|---|---|---|
| | resin | kind | amt. of addn.* (wt. %) | before friction luster | after friction fluffing |
| Examples | | | | | |
| 1 | A | | | dim luster | none |
| 2 | B | | | " | " |
| 3 | C | S | 40 | " | " |
| 4 | D | | | " | " |
| 5 | E | | | " | " |
| 6 | A | | | superior to Exs. 1–5 | none |
| 7 | B | | | superior to Exs. 1–5 | " |
| 8 | C | GB | 40 | superior to Exs. 1–5 | " |
| 9 | D | | | superior to Exs. 1–5 | " |
| 10 | E | | | superior to Exs. 1–5 | " |
| 11 | A | | | comparable with Exs. 1–5 | none |
| 12 | B | | | comparable with Exs. 1–5 | " |
| 13 | C | S | 25 | comparable with Exs. 1–5 | " |
| 14 | D | GF | 15 | comparable with Exs. 1–5 | " |
| 15 | E | | | comparable with Exs. 1–5 | " |
| 16 | A | | | comparable with Exs. 1–5 | none |
| 17 | B | | | comparable with Exs. 1–5 | " |
| 18 | C | GB | 25 | comparable with Exs. 1–5 | " |
| 19 | D | GF | 15 | comparable with Exs. 1–5 | " |
| 20 | E | | | comparable with Exs. 1–5 | " |

Note:
symbols on fillers are as defined in Table 1, provided that S is silica powder.
*the amount of addition based on the total amount of the composition

COMPARATIVE EXAMPLES 1 TO 5

The same tests as in the above-mentioned examples were conducted using resins A, B, C, D, and E without incorporating any filler.
The results are shown in Table 3.

TABLE 3

| | | surface state | |
|---|---|---|---|
| | resin | before friction luster | after friction fluffing |
| Comp. Ex. | | | |
| 1 | A | lustrous | observed |
| 2 | B | " | " |
| 3 | C | " | " |
| 4 | D | " | " |
| 5 | E | " | " |

The resins A to E were respectively comprised of the following structural units:

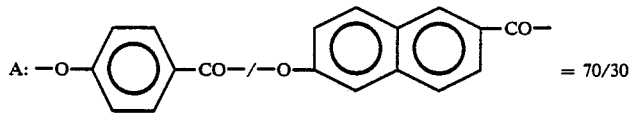

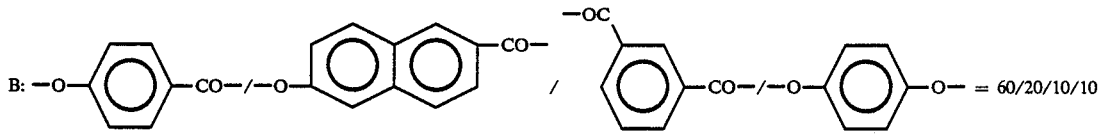

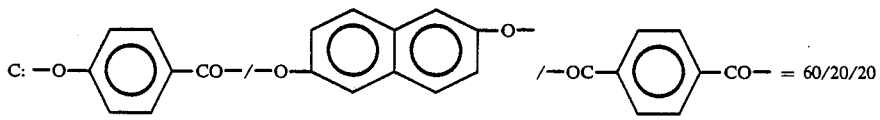

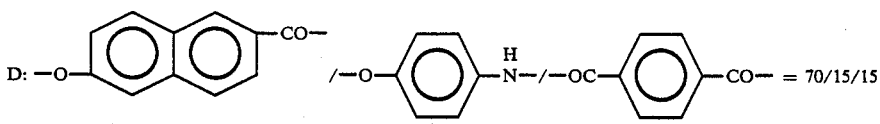

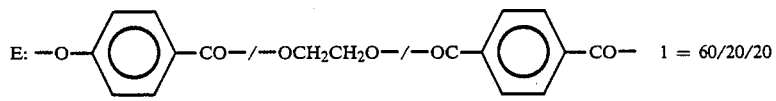

(The above numerals represent molar ratios.)

We claim:

1. A liquid crystal polyester composition, having excellent surface characteristics, which comprises 99.5 to 30 percent by weight of a polyester and 0.5 to 70 percent by weight of a particulate filler material having an aspect ratio of up to 3 and an average particulate diameter of 1 to 50 μm, the polyester being of a type which is melt processable and which, in the molten state, displays anisotropy.

2. The composition as claimed in claim 1, wherein said particulate filler material is at least one member selected from the group consisting of alumina, silica, barium sulfate, glass bead, glass powder, an organic high molecular fluorocarbon resin, and organic low-molecular crystals of brominated diphenyl ether.

3. The composition as claimed in claim 2 wherein the aspect ratio of the particulate filler material is in the range of 1 to 2.

4. The composition as claimed in claim 1 wherein fibrous material is incorporated together with the particulate filler material.

5. The composition as claimed in claim 4, wherein the fibrous material is incorporated in an amount equal to or less than that of said particulate filler material.

6. The composition as claimed in claim 4 wherein the fibrous material has an aspect ratio of 5 to 70.

7. The liquid crystal polyester resin composition according to claim 4, wherein the fibrous material is at least one fiber selected from the group consisting of glass fiber, carbon fiber, graphitized fiber, whisker, metallic fiber, inorganic fiber, synthetic fiber, and mineral fiber.

8. The composition according to claim 4 wherein the total weight of the particulate filler material and the fibrous material is not more than 70% by weight based on the total weight of the composition.

9. The composition of claim 1 wherein the polyester is composed of at least one member selected from the group consisting of aromatic dicarboxylic acids and alicyclic dicarboxylic acids and at least one member selected from the group consisting of aromatic diols, alicyclic diols, and aliphatic diols.

10. The composition of claim 1 wherein the polyester is composed of aromatic hydroxy carboxylic acids.

11. The composition of claim 1 wherein the polyester is composed of at least one member selected from the group consisting of aromatic dicarboxylic acids and alicyclic dicarboxylic acids, at least one member selected from the group consisting of aromatic diols, and aromatic hydroxy carboxylic acids.

12. The composition of claim 1 wherein the polyester is composed of at least one member selected from the group consisting of aromatic dicarboxylic acids and alicyclic dicarboxylic acids, at least one member selected from the group consisting of aromatic diols, aromatic hydroxy carboxylic acids, and at least one member selected from the group consisting of aromatic hydroxy amines and aromatic diamines.

13. The composition of claim 1 wherein the liquid crystal polyester has a weight—average molecular weight of about 2,000 to 200,000.

14. The composition of claim 1 wherein the liquid crystal polyester possesses an inherent viscosity of at least about 2.0 dl/g to 10.0 dl/g.

15. A liquid crystal polyester composition having excellent surface characteristics which comprises 99.5 to 30 percent by weight of a polyester and 0.5 to 70 percent by weight of a particulate filler material having an aspect ratio of up to 3 and an average particle size of 0.1 to 100 μm, said particulate filler material having a fibrous material incorporated therewith, said polyester being of a type which is melt processable and which, in the molten, state displays anisotropy.

16. The composition as claimed in claim 15, wherein said particulate filler material is at least one member selected from the group consisting of alumina, silica, barium sulfate, glass bead, glass powder, an organic high molecular fluorocarbon resin, and organic low-molecular crystals of brominated diphenyl ether.

17. The composition as claimed in claim 15 wherein the aspect ratio of the particulate filler material is in the range of 1 to 2.

18. The composition as claimed in claim 15, wherein the average particulate diameter of the particulate filler material is 1 to 50 μm.

19. The composition as claimed in claim 15, wherein the fibrous material is incorporated in an amount equal to or less than that of said particulate filler material.

20. The composition as claimed in claim 15, wherein the fibrous material has an aspect ratio of 5 to 70.

21. The liquid crystal polyester resin composition according to claim 16, wherein the fibrous material is at least one fiber selected from the group consisting of glass fiber, carbon fiber, graphitized fiber, whisker, metallic fiber, inorganic fiber, synthetic fiber, and mineral fiber.

22. The composition according to claim 15, wherein the total weight of the particulate filler material and the fibrous material is not more than 70% by weight based on the total weight of the composition.

23. The composition of claim 15, wherein the polyester is composed of at least one member selected from the group consisting of aromatic dicarboxylic acids and alicyclic dicarboxylic acids and at least one member selected from the group consisting of aromatic diols, alicyclic diols, and aliphatic diols.

24. The composition of claim 15, wherein the polyester is composed of aromatic hydroxy carboxylic acids.

25. The composition of claim 15, wherein the polyester is composed of at least one member selected from the group consisting of aromatic dicarboxylic acids and alicyclic dicarboxylic acids, at least one member selected from the group consisting of aromatic diols, and aromatic hydroxy carboxylic acids.

26. The composition of claim 15, wherein the polyester is composed of at least one member selected from the group consisting of aromatic dicarboxylic acids and alicyclic dicarboxylic acids, at least one member selected from the group consisting of aromatic diols, aromatic hydroxy carboxylic acids, and at least one member selected from the group consisting of aromatic hydroxy amines and aromatic diamines.

27. The composition of claim 15, wherein the liquid crystal polyester has a weight—average molecular weight of about 2,000 to 200,000.

28. The composition of claim 15, wherein the liquid crystal polyester possesses an inherent viscosity of at least about 2.0 dl/g to 10.0 dl/g.

* * * * *